(12) United States Patent
Fukada (10) Patent No.: US 10,384,166 B2
(45) Date of Patent: Aug. 20, 2019

(54) MEMBRANE MODULE APPARATUS, PACKAGING BODY, LIQUID TREATMENT SYSTEM, STEAM STERILIZATION METHOD AND SYSTEM CONSTRUCTING METHOD

(71) Applicant: ASAHI KASEI MEDICAL CO., LTD., Tokyo (JP)

(72) Inventor: Seiji Fukada, Tokyo (JP)

(73) Assignee: ASAHI KASEI MEDICAL CO., LTD., Tokyo (JP)

( * ) Notice: Subject to any disclaimer, the term of this patent is extended or adjusted under 35 U.S.C. 154(b) by 388 days.

(21) Appl. No.: 15/103,598

(22) PCT Filed: Dec. 25, 2014

(86) PCT No.: PCT/JP2014/084248
§ 371 (c)(1),
(2) Date: Jun. 10, 2016

(87) PCT Pub. No.: WO2015/099015
PCT Pub. Date: Jul. 2, 2015

(65) Prior Publication Data
US 2016/0310906 A1    Oct. 27, 2016

(30) Foreign Application Priority Data
Dec. 27, 2013  (JP) .................. 2013-272996

(51) Int. Cl.
*B01D 65/02*  (2006.01)
*B01D 63/02*  (2006.01)

(52) U.S. Cl.
CPC .......... *B01D 65/022* (2013.01); *B01D 63/02* (2013.01); *B01D 65/02* (2013.01); *B01D 2313/13* (2013.01); *B01D 2321/08* (2013.01)

(58) Field of Classification Search
CPC ............ B01D 2313/13; B01D 2321/08; B01D 63/02; B01D 65/02; B01D 65/022
See application file for complete search history.

(56) References Cited

U.S. PATENT DOCUMENTS

| 4,411,866 A | 10/1983 | Kanno |
| 5,683,916 A | 11/1997 | Goffe et al. |
| 2013/0048111 A1 | 2/2013 | Gebauer |

FOREIGN PATENT DOCUMENTS

| JP | 57-49468 | 3/1982 |
| JP | 61-143072 | 6/1986 |

(Continued)

OTHER PUBLICATIONS

English translation of Japanese Patent Application No. 3-277370 A (Dec. 1991).*

(Continued)

*Primary Examiner* — John Kim
(74) *Attorney, Agent, or Firm* — Greenblum & Bernstein, P.L.C.

(57) ABSTRACT

Provided is a membrane module apparatus capable of allowing an aseptic connection member to be applicable to a hollow fiber membrane module and avoiding the need for a user to perform a sterilization treatment. A membrane module apparatus includes: a hollow fiber membrane module to be filled with a liquid during steam sterilization; thermoplastic tubes, being aseptic connection members, for aseptically connecting the membrane module apparatus to another duct; connecting tubes for connecting liquid ports of the hollow fiber membrane module respectively to the thermoplastic tubes; and closure members capable of pinching and closing the connecting tubes. The connecting tubes have heat resistance to the steam sterilization. An expansion member is connected to a liquid port of the hollow fiber membrane module.

12 Claims, 7 Drawing Sheets

(56) References Cited

FOREIGN PATENT DOCUMENTS

| JP | 62-164469   | 7/1987  |
|----|-------------|---------|
| JP | 2-5963      | 1/1990  |
| JP | 3-277370    | 12/1991 |
| JP | 8-266618    | 10/1996 |
| JP | 2007-197858 | 8/2007  |
| JP | 2010-259992 | 11/2010 |
| JP | 2011-212177 | 10/2011 |
| JP | 2013-516315 | 5/2013  |

OTHER PUBLICATIONS

Search Report issued in Japan Patent Application No. PCT/JP2014/084248, dated Mar. 17, 2015.
Written Opinion issued in Japan Patent Application No. PCT/JP2014/084248 and English Translation thereof, dated Mar. 17, 2015.
International Preliminary Report on Patentability issued in Japan Patent Application No. PCT/JP2014/084248, dated Jun. 28, 2016.
Search Report issued in European Patent Office (EPO) Patent Application No. 14873543.4, dated Nov. 23, 2016.
EPO Official Communication received in Application No. 14 873 543.4, dated Jul. 10, 2018.
EPO Official Communication received in Application No. 14 873 543.4, dated Oct. 5, 2017.
EPO Official Communication received in Application No. 14 873 543.4, dated Dec. 9, 2016.

* cited by examiner

MEMBRANE MODULE APPARATUS, PACKAGING BODY, LIQUID TREATMENT SYSTEM, STEAM STERILIZATION METHOD AND SYSTEM CONSTRUCTING METHOD

TECHNICAL FIELD

The present invention relates to a membrane module apparatus, a packaging body containing the membrane module apparatus, a liquid treatment system, a steam sterilization method of a hollow fiber membrane module and a liquid treatment system constructing method.

BACKGROUND ART

Treatments, such as a culture medium filtering treatment that is a filtering treatment performed for supplying a culture solution into a cell culture tank and a virus removing treatment performed in a manufacturing process of pharmaceutical preparations, are performed by connecting a hollow fiber membrane module to a liquid treatment circuit.

Since such culture medium filtering treatment and virus removing treatment are required to be performed under a strict aseptic condition, the hollow fiber membrane module is subjected, before shipping, to a steam sterilization treatment in a state in which the hollow fiber membrane module is filled with a liquid and closed by directly attaching a cap into its liquid port. After the steam sterilization treatment, the hollow fiber membrane is shipped out with its aseptic condition maintained.

A (dry-state) membrane module whose membrane is dry requires a filter, which has been wet for a pinhole test, to be dried, and spends much time and heat (energy). On the other hand, a membrane module filled with a liquid can be used even after long-term storage and does not require the filling liquid to be removed from inside the membrane module after the pinhole test conducted before the shipping, and it is therefore preferable in terms of its reduced number of manufacturing steps.

SUMMARY

Technical Problem

However, when the culture medium filtering treatment, etc., is actually performed using the sterilized hollow fiber membrane module, a user detaches the cap from the liquid port of the hollow fiber membrane module and connects a tube of the liquid treatment circuit to the liquid port and such process might degrade the aseptic condition of the hollow fiber membrane module. Therefore, another sterilization treatment has been typically performed by allowing a clarifying liquid to flow through the circuit after connecting the hollow fiber membrane module to the liquid treatment circuit. Such sterilization treatment performed during the connection of the hollow fiber membrane module requires time and effort for preparing the culture filtering treatment, etc. In light of the above circumstances, a so-called aseptic connection of a hollow fiber membrane module to a liquid treatment circuit has been considered in order to eliminate the need for a user to perform the sterilization treatment when connecting the hollow fiber membrane module to the liquid treatment circuit.

Meanwhile, there is a technique for connecting tubes to each other in an aseptic condition using an aseptic connection member. An example of such aseptic connection member may be a thermoplastic tube, in which tubes can be aseptically connected by thermal welding using a dedicated tube joining apparatus. Another example may be an aseptic connection connector to be attached to respective extremities of the tubes to be connected, in which connecting surfaces of the aseptic connection connectors are fixed and a membrane interposed between the connecting surfaces is pulled out to thereby achieve the aseptic connection.

However, the hollow fiber membrane module is filled with a liquid and subjected to steam sterilization before shipping, as described above. Thus, if the above-mentioned aseptic connection member is simply applied to the hollow fiber membrane module and connected to the liquid port thereof, the liquid inside the hollow fiber membrane module will undesirably contact the aseptic connection member. In the case of the thermoplastic tubes above, for example, if a liquid exists within the tubes during connection, it will become difficult for the tubes to be thermally welded, causing a detriment to the aseptic connection. In the case of the aseptic connection connector, the membrane will get wet due to the liquid and the aseptic level may be degraded.

The present invention has been made in consideration of the above circumstances and an object of the present invention is to provide a membrane module apparatus for steam sterilization, a packaging body, a liquid treatment system having the membrane module apparatus, a steam sterilization method of a hollow fiber membrane module and a construction method of the liquid treatment system, which are capable of allowing the above-mentioned aseptic connection member to be applicable to a hollow fiber membrane module that is filled with a liquid and sterilized during steam sterilization, thereby avoiding the need for a user to perform another sterilization treatment after the connection to a liquid treatment circuit.

Solution to Problem

As a result of an intensive study for the purpose of achieving the object set forth above, the inventors have found that an aseptic connection member can be applied to a hollow fiber membrane module by connecting the hollow fiber membrane module and the aseptic connection member by a heat-resistant connecting tube and providing the connecting tube with a closure member, and have thereby achieved the present invention. Specifically, the present invention provides, as an example, the following items (1) to (22):

(1) A membrane module apparatus to be subjected to steam sterilization, comprising: a hollow fiber membrane module filled with a liquid; an aseptic connection member for aseptically connecting the membrane module apparatus to another duct; a connecting tube for connecting a liquid port of the hollow fiber membrane module and the aseptic connection member to each other; and a closure member capable of pinching and closing the connecting tube, wherein the connecting tube has heat resistance to the steam sterilization.

(2) The membrane module apparatus according to (1), wherein the closure member has a structure of applying pressure to the connecting tube by a screw mechanism to close the connecting tube.

(3) The membrane module apparatus according to (1) or (2), further comprising an opening/closing part that opens and closes an internal space, the internal space being located on the aseptic connection member side with respect to the closure member, in the connecting tube relative to an atmosphere.

(4) The membrane module apparatus according to any one of (1) to (3), further comprising a fixing apparatus for fixing at least one of the connecting tube and the aseptic connection member.
(5) The membrane module apparatus according to (4), wherein the fixing apparatus includes a fixing plate and a fixture for fixing at least one of the connecting tube and the aseptic connection member onto the fixing plate.
(6) The membrane module apparatus according to any one of (1) to (5), wherein the connecting tube is made of a silicon resin or a fluorine resin.
(7) The membrane module apparatus according to any one of (1) to (6), wherein the hollow fiber membrane module has a plurality of liquid ports, and at least one of the liquid ports is connected to an expansion member that expands due to an increase in an internal pressure of the hollow fiber membrane module during the steam sterilization.
(8) The membrane module apparatus according to (7), wherein the hollow fiber membrane module has two liquid ports communicating with an inside of a hollow fiber membrane and two liquid ports communicating with an outside of the hollow fiber membrane, and wherein one of the liquid ports communicating with the outside of the hollow fiber membrane is connected to the expansion member and the other three liquid ports are connected to the connecting tube.
(9) The membrane module apparatus according to any one of (1) to (8), wherein the aseptic connection member is a thermoplastic tube capable of providing aseptic connection by thermal welding.
(10) The membrane module apparatus according to any one of (1) to (8), wherein the aseptic connection member is an aseptic connection connector that provides aseptic connection by removing a membrane interposed between connecting surfaces.
(11) A packaging body containing a membrane module apparatus, the packaging body hermetically packaging the membrane module apparatus according to any one of (1) to (10).
(12) The packaging body containing a membrane module apparatus according to (11), wherein the packaging body provides packaging by an air permeable member.
(13) A packaging body that hermetically packages a membrane module apparatus to be subjected to steam sterilization, wherein the membrane module apparatus comprises: a hollow fiber membrane module filled with a liquid; a connecting tube having heat resistance to the steam sterilization, the connecting tube being connected to a liquid port of the hollow fiber membrane module; a closure member capable of pinching and closing the connecting tube; and an aseptic connection member for aseptically connecting the membrane module apparatus to another duct, wherein the connecting tube and the aseptic connection member are separated from each other and connectable to each other.
(14) The packaging body containing a membrane module apparatus according to (13), wherein the connecting tube and the aseptic connection member are connectable to each other using a half-splittable connector.
(15) A liquid treatment system constructed by aseptically connecting the aseptic connection member of the membrane module apparatus according to any one of (1) to (14) and another duct to each other.
(16) A method of sterilizing by steam a hollow fiber membrane module filled with a liquid, the method comprising: connecting a heat resistant connecting tube to all or part of liquid ports of the hollow fiber membrane module; closing the connecting tube with a closure member; and sterilizing by steam the hollow fiber membrane module with an aseptic connection member being connected to the connecting tube.
(17) A method of sterilizing by steam a hollow fiber membrane module filled with a liquid, the method comprising: connecting a connecting tube having heat resistance to steam sterilization to all or part of liquid ports of the hollow fiber membrane module; closing the connecting tube with a closure member; and sterilizing by steam the hollow fiber membrane module with the connecting tube and an aseptic connection member being separated from each other.
(18) The method of sterilizing by steam a hollow fiber membrane module according to (16) or (17), wherein the steam sterilization is performed with the hollow fiber membrane module, the connecting tube and the aseptic connection member being hermetically packaged in an air permeable member.
(19) The method of sterilizing by steam a hollow fiber membrane module according any one of (16) to (18), wherein the steam sterilization is performed with an internal space, located on the aseptic connection member side with respect to the closure member, in the connecting tube being opened to a steam atmosphere.
(20) The method of sterilizing by steam a hollow fiber membrane module according any one of (16) to (19), wherein the steam sterilization is performed with at least one of the connecting tube and the aseptic connection member being fixed by a fixing apparatus.
(21) A method of constructing a liquid treatment system by aseptically connecting a hollow fiber membrane module filled with a liquid to another duct, the method comprising: a step of connecting a connecting tube having heat resistance to steam sterilization to all or part of liquid ports of the hollow fiber membrane module, connecting an aseptic connection member to the connecting tube, and closing the connecting tube with a closure member; a step of hermetically packaging, with an air permeable member, the hollow fiber membrane module, the connecting tube connected to the hollow fiber membrane module and the aseptic connection member connected to the connection tube; a step of sterilizing the hollow fiber membrane module by steam after the step of hermetic packaging; and a step of aseptically connecting the aseptic connection member to the another duct.
(22) A method of constructing a liquid treatment system by aseptically connecting a hollow fiber membrane module filled with a liquid to another duct, the method comprising: a step of connecting a connecting tube having heat resistance to steam sterilization to all or part of liquid ports of the hollow fiber membrane module and closing the connecting tube with a closure member; a step of hermetically packaging, with an air permeable member, the hollow fiber membrane module, the connecting tube connected to the hollow fiber membrane module and an aseptic connection member; a step of sterilizing the hollow fiber membrane module by steam with the connecting tube and the aseptic connection member being separated from each other, after the step of hermetic packaging; a step of connecting the aseptic connection member to the connecting tube after the steam sterilization step; and a step of aseptically connecting the aseptic connection member to the another duct.

Advantageous Effects of Invention

According to the present invention, since the above-mentioned aseptic connection member can be applied to a hollow fiber membrane module, it is not necessary to perform another sterilization treatment during the connection of the hollow fiber membrane module to a liquid treatment circuit and it is therefore possible to reduce the effort and time required for preparing a culture medium filtering treatment, etc.

DESCRIPTION OF EMBODIMENTS

Preferred embodiments of the present invention will be described below with reference to the attached drawings. It should be noted that the following embodiments are examples for explaining the present invention and that the present invention is not limited to those embodiments. The same elements are denoted by the same reference symbols and redundant explanation thereof will be omitted. In the drawings, positional relationships such as top, bottom, right and left are based on the positional relationships shown in the drawings, unless otherwise indicated. In addition, the dimensional ratios shown in the drawings are not limited to those illustrated.

Figure 1:
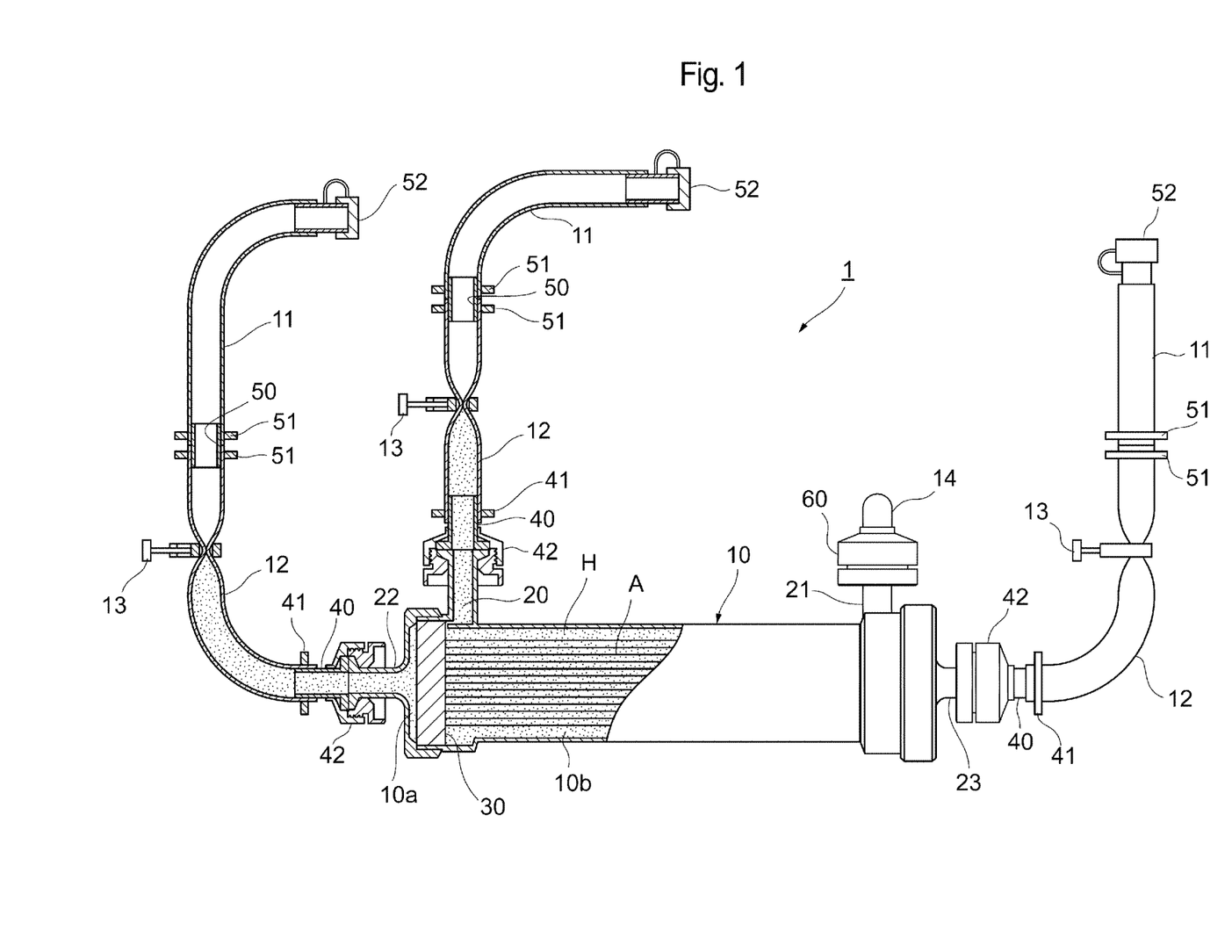
FIG. 1 is an illustration showing an outline of a membrane module apparatus.

FIG. 1 is an illustration showing an example configuration of a membrane module apparatus 1 for steam sterilization according to the present embodiment.

As shown in FIG. 1, the membrane module apparatus 1 includes a hollow fiber membrane module 10 that is filled with a liquid during, for example, steam sterilization, thermoplastic tubes 11 serving as an aseptic connection member to be used for aseptically connecting the membrane module apparatus 1 to another duct, connecting tubes 12 that connect liquid ports of the hollow fiber membrane module 10 and the thermoplastic tubes 11, closure members 13 capable of pinching and closing the respective connecting tubes 12, and an expansion member 14 that expands due to an increase in the internal pressure of the hollow fiber membrane module 10 during the steam sterilization.

The hollow fiber membrane module 10 is formed in, for example, a cylindrical form and provided with two liquid ports (nozzles) 20 and 21 on its lateral surface and liquid ports (nozzles) 22 and 23 on its respective ends in a longitudinal direction (the right-left direction in FIG. 1).

The hollow fiber membrane module 10 accommodates a hollow fiber membrane A oriented in the longitudinal direction. A space in a duct of the hollow fiber membrane A (a primary space) communicates with the liquid ports 22 and 23, while a space outside a wall of the hollow fiber membrane A (a secondary space) communicates with the liquid ports 20 and 21. The primary space 10a of the hollow fiber membrane A communicating with the liquid ports 22 and 23 and the secondary space 10b of the hollow fiber membrane A communicating with the liquid ports 20 and 21 are isolated from each other by a potting agent 30 provided in the vicinity of both ends in the longitudinal direction of the hollow fiber membrane module 10.

The connecting tube 12 has heat resistance to steam sterilization. In other words, the connecting tube 12 is made of a material that does not melt and deform at a steam sterilization temperature of, for example, 121 degrees Celsius at the lowest. In addition, the connecting tube 12 has a flexibility so as to be closable by the closure member 13 to be described later. Examples of preferable materials for the connecting tube 12 include a silicon resin and a fluorine resin. Available materials for the connecting tube 12 are those having a melting point higher than, for example, the steam sterilization temperature, preferably having a melting point higher than 165 degrees Celsius, more preferably having a melting point higher than 250 degrees Celsius. In addition, the available materials for the connecting tube 12 are preferably usable under a condition of 150 degrees Celsius, more preferably usable under a condition of 200 degrees Celsius.

The connecting tubes 12 are connected to, for example, three liquid ports, e.g., the liquid ports 20, 22 and 23. One end of each connecting tube 12 is connected to, for example, a connector 40 provided in each liquid port 20, 22, 23 and fixed by a tube band 41. The connector 40 is fixed to a nozzle of each liquid port 20, 22, 23 by a clamp 42 having, for example, a cylindrical screw structure. The connection method between the connecting tube 12 and each liquid port 20, 22, 23 is not particularly limited and other mechanisms may be used as long as airtight connection can be provided.

The thermoplastic tube 11 is a thermoplastic tube capable of providing aseptic connection by thermal welding. A material of the thermoplastic tube 11 may be, for example, a material which can be subjected to a steam sterilization treatment at 121 degrees Celsius but whose melting point is 165 degrees Celsius or lower.

The thermoplastic tube 11 has one end thereof connected to the connecting tube 12. For example, the thermoplastic tube 11 and the connecting tube 12 may be connected, for example, via an I-type connector 50. The thermoplastic tube 11 and the connecting tube 12 are fixed to the I-type connector 50 using the tube bands 51. The connection method between the thermoplastic tube 11 and the connecting tube 12 is not particularly limited and other methods may be used as long as airtight connection can be provided.

An opening at an extremity of the thermoplastic tube 11 is provided with an opening/closing cap 52, being an opening/closing part, capable of opening and closing the internal space of the connecting tube 12 and the thermoplastic tube 11 relative to the atmosphere.

The closure member 13 has a structure of applying pressure to close the connecting tube 12 using, for example, a screw mechanism. The closure member 13 may employ, for example, a metallic Hoffman-type pinch cock.

The expansion member 14 may be formed of, for example, rubber that is expandable to a balloon-like shape. The expansion member 14 is fixed to a nozzle of the liquid port 21 using, for example, a clamp 60 having a cylindrical screw structure. The connection method between the expansion member 14 and the liquid port 21 is not particularly limited and other methods may be used as long as airtight connection can be provided.

Figure 2:
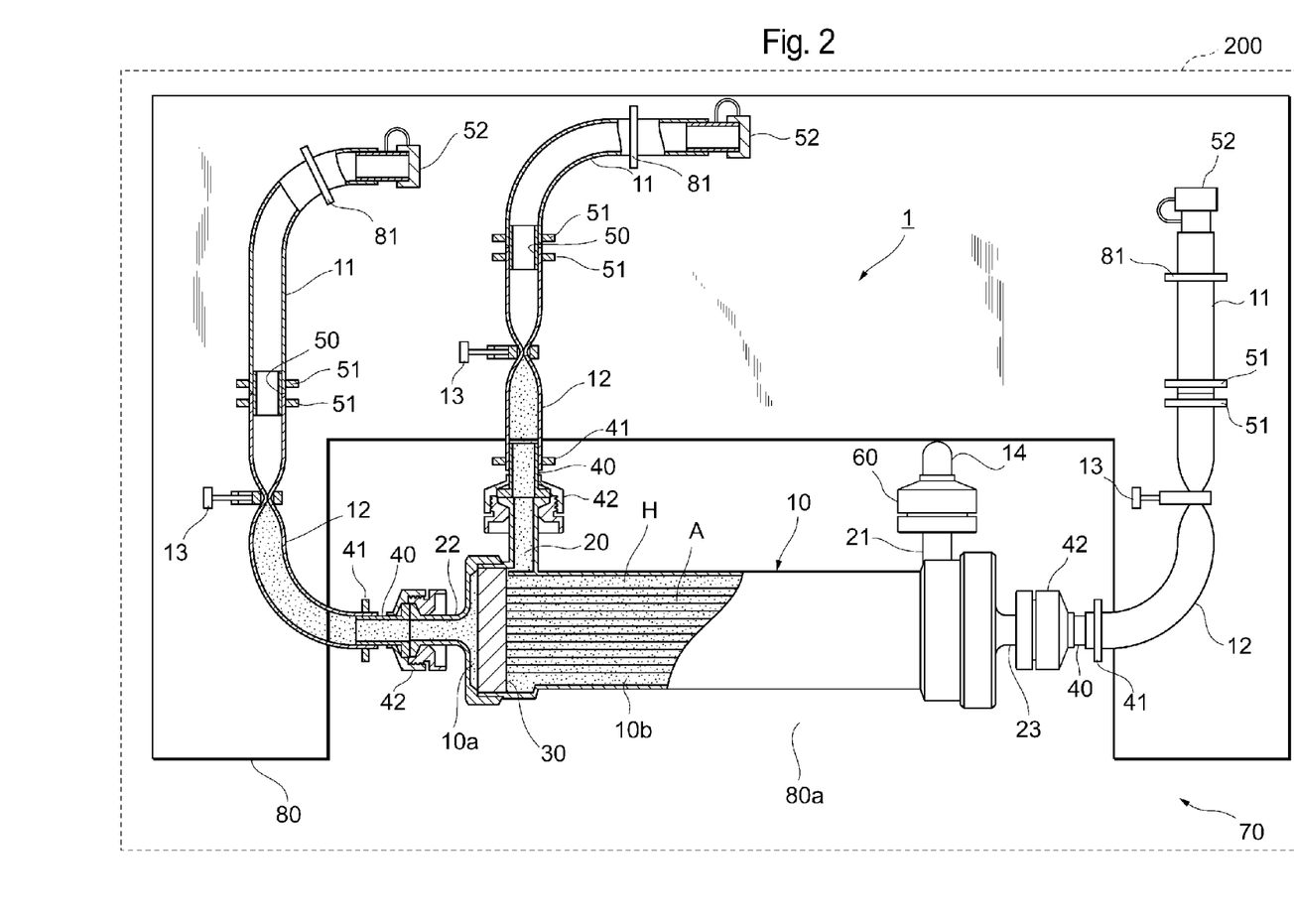
FIG. 2 is an illustration showing the membrane module apparatus fixed to a fixing apparatus.

The membrane module apparatus 1 includes a fixing apparatus 70 that fixes at least one of the connecting tube 12 and the thermoplastic tube 11 during steam sterilization, as shown in FIG. 2.

The fixing apparatus 70 includes, for example, a fixing plate 80 and a plurality of fixtures 81 for fixing the tubes to the fixing plate 80. The fixing plate 80 has a substantially quadrangular shape and has, at a lower central part thereof, a recessed cutout 80a for arranging the hollow fiber membrane module 10 therein. The fixtures 81 may be, for example, tube bands which are provided at more than one part, e.g., in the vicinity of the right end, the center and the left end, of an upper part of the fixing plate 80. For example, a polypropylene flat plate may be used as the fixing plate 80.

Next, the following description will describe a steam sterilization method of the hollow fiber membrane module 10 using the membrane module apparatus 1 having the configurations as described above.

First, the thermoplastic tubes 11 and the connecting tubes 12 are connected to each other and, in this state, they are detached from the hollow fiber membrane module 10.

Then, the hollow fiber membrane module 10 is filled with pure water H, being a liquid, and each liquid port 20-23 is temporarily stopped.

Next, a central part of the connecting tube 12 is closed by the closure member 13. The opening end of the connecting tube 12 is oriented upward and the pure water H is introduced into the connecting tube 12. As a result, the internal space, located on the opening end side with respect to the closure member 13, in the connecting tube 12 is filled with the pure water H, and is then frozen such that the pure water H does not spill out.

Next, as shown in FIG. 1, the expansion member 14 is connected to one liquid port 21 of the hollow fiber membrane module 10 such that the pure water H within the hollow fiber membrane module 10 does not leak out. During this process, the expansion member 14 is in a contracted state.

The connecting tubes 12 filled with the pure water H are connected respectively to the three liquid ports 20, 22 and 23 of the hollow fiber membrane module 10 such that the pure water H within the hollow fiber membrane module 10 does not leak out. In this way, the membrane module apparatus 1 in the state shown in FIG. 1 can be obtained. It should be noted that the filling rate of the pure water H in the sealed space including the hollow fiber membrane module 10 and the connecting tubes 12 is preferably from 20% to 100%, more preferably from 50% to 100%, and even more preferably from 95% to 100%, based on the entire sealed space. It should also be noted that the above filing rate is indicated by a volume ratio at a normal temperature.

Next, as shown in FIG. 2, the thermoplastic tubes 11 of the membrane module apparatus 1 are fixed to the fixing apparatus 70. During this process, the hollow fiber membrane module 10 is arranged, with the liquid ports 20 and 21 oriented upward, in the cutout 80a at the lower central part of the fixing plate 80, and the thermoplastic tubes 11 are each extended upward so as to be fixed onto the fixing plate 80 by the fixtures 81. At this time, the thermoplastic tubes 11 are extended as much as possible so as to be fixed without sagging. The opening/closing cap 52 of each thermoplastic tube 11 is opened to open the internal space on the extremity side with respect to the closure member 13 (the internal space, located on the thermoplastic tube 11 side with respect to the closure member 13, in the connecting tube 12 and the internal space of the thermoplastic tube 11) to the atmosphere.

Next, the membrane module apparatus 1 fixed onto the fixing apparatus 70 is placed in a sterilized bag 200, being a packaging body of an air permeable member, and then hermetically sealed. The membrane module apparatus 1 is then placed in a steam sterilization apparatus. During this process, the fixing plate 80 is inserted into a predetermined accommodating part in an upright state, the membrane module apparatus 1 is loaded onto a dolly with the expansion member 14 oriented upward, and the dolly is placed in a sterilization chamber of the steam sterilization apparatus. In the sterilization chamber, the hollow fiber membrane module 10 is sterilized by steam in the steam atmosphere at 121 degrees Celsius. During this process, since the thermoplastic tubes 11 are opened, the space in the thermoplastic tube 11 and the space, located on the thermoplastic tube 11 side with respect to the closure member 13, in the connecting tube 12 are also exposed to the steam atmosphere and sterilized. Although the internal pressure of the hollow fiber membrane module 10 greatly varies due to the temperature variation during the steam sterilization, the pure water H will not leak out as it is sealed by the closure member 13. After the steam sterilization is completed, water other than the water filling the filter is removed by drying, the opening/closing cap 52 is closed, and the membrane module apparatus 1 is shipped out in such state.

Figure 3:
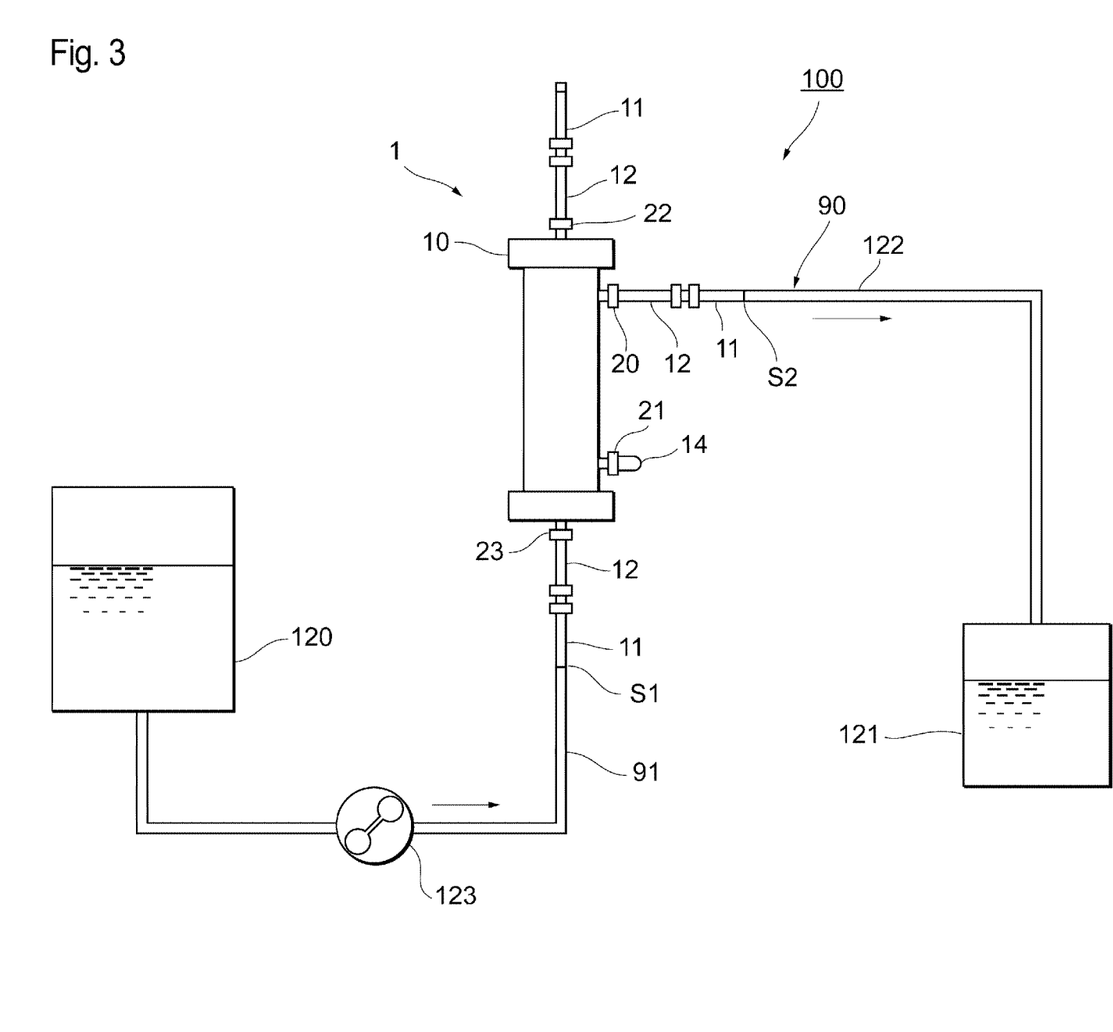
FIG. 3 is an illustration showing a configuration of a liquid treatment system.

The following description will describe an example of constructing a liquid treatment system 100 by connecting the thermoplastic tube 11 of the membrane module apparatus 1 and a liquid treatment circuit 90, as shown in FIG. 3. For example, the liquid treatment circuit 90 of the liquid treatment system 100 includes a culture medium regulating tank 120, a cell culturing tank 121, tubes 122 connecting the culture medium regulating tank 120 and the cell culturing tank 121 to the membrane module apparatus 1, and a pump 123. The tubes 122 may be, for example, thermoplastic tubes.

Figure 4:
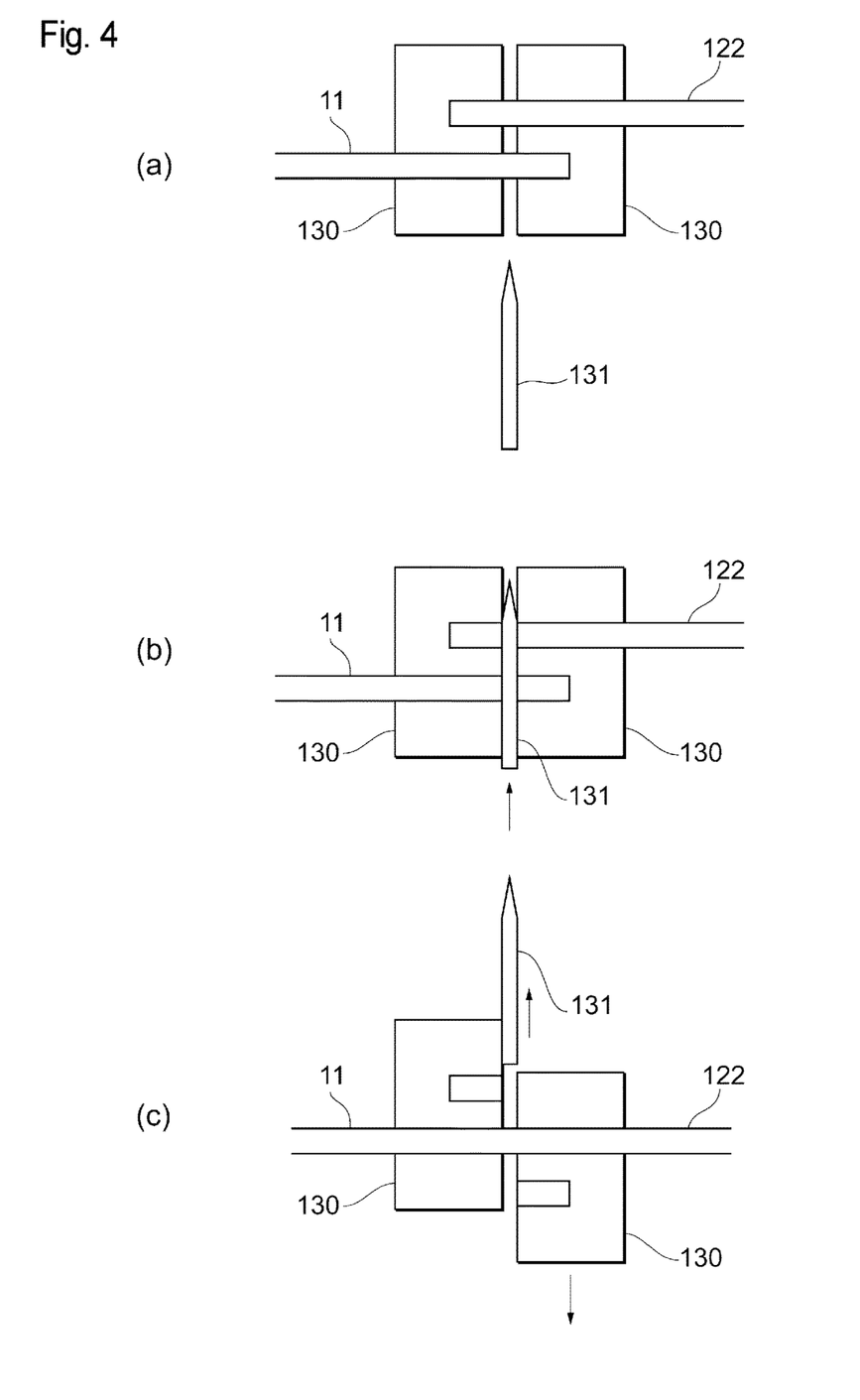
FIG. 4 is an illustration explaining aseptic connection of thermoplastic tubes.

The membrane module apparatus 1 after the completion of the above-mentioned steam sterilization is taken out of the sterilized bag, the fixing apparatus 70 is detached therefrom, and the thermoplastic tubes 11 of the membrane module apparatus 1 and the thermoplastic tubes 122 of the liquid treatment circuit 90 are aseptically connected using a dedicated tube joining apparatus. For example, as shown in FIGS. 4(a) to 4(c), the thermoplastic tube 11 and the thermoplastic tube 122 are held in parallel by a tube holding part 130 of the tube joining apparatus, the tubes 11 and 122 are cut by a blade 131 while cut surfaces of the tubes 11 and 122 are being shifted, and heat is applied to the cut surfaces to thermally welding them. For example, Sterile Tube Fuser manufactured by GE Healthcare, C'eal-Flex TPE Ultra Sealer manufactured by Saint-Gobain and BioWelder (registered trademark) manufactured by Sartorius Stedim Biotech may be used as the tube joining apparatus.

The thermoplastic tube 122 communicating with the culture medium regulating tank 120 is aseptically connected (portion S1 in FIG. 3) to the thermoplastic tube 11 of the liquid port 23 of the hollow fiber membrane module 10 and the thermoplastic tube 122 communicating with the cell culturing tank 121 is aseptically connected (portion S2 in FIG. 3) to the thermoplastic tube 11 of the liquid port 20 of the hollow fiber membrane module 10. In this way, the liquid treatment system 100 is constructed. In this liquid treatment system 100, for example, a cell culture solution in the culture medium regulating tank 120 is sent to the primary side of the hollow fiber membrane A in the hollow fiber membrane module 10 by a pump 123 through the tube 122 and the culture solution that has passed through the hollow fiber membrane A is collected by the cell culturing tank 121 through the tube 122.

According to the present embodiment, since the liquid ports 20, 22 and 23 of the hollow fiber membrane module 10 and the thermoplastic tubes 11, being aseptic connection members, can be connected via the connecting tubes 12 and the closure members 13 can be attached to the respective connecting tubes 12, it is possible to prevent the pure water H filling the hollow fiber membrane module 10 from entering the thermoplastic tubes 11. With such configuration, it is possible to appropriately perform the aseptic connection by means of thermal welding of the thermoplastic tubes 11. In addition, since the connecting tubes 12 have heat resistance to steam sterilization, it can withstand the steam sterilization. Accordingly, the thermoplastic tubes 11 serving as the aseptic connection members can be applied to the hollow fiber membrane module 10. Consequently, it is possible to eliminate the need to perform a sterilization treatment when the hollow fiber membrane module 10 is connected to the liquid treatment circuit 90 of the liquid treatment system 100 and it is therefore possible to reduce the effort and time required for treatments such as a culture medium filtering treatment.

Since the closure member 13 has a structure of closing the connecting tube 12 by applying pressure thereto with its screw mechanism, it is possible to prevent the closure member 13 from being loosened, even when the internal pressure of the hollow fiber membrane module 10 greatly varies during the steam sterilization, and it is thus possible to maintain a highly closed state.

Since the thermoplastic tube 11 can be opened and closed by the opening/closing cap 52, the internal space of the thermoplastic tube 11 and the connecting tube 12 can be exposed to the atmosphere during the steam sterilization and thereby sterilized.

Since the membrane module apparatus 1 has the fixing apparatus 70 for fixing at least one of the connecting tube 12 and the thermoplastic tube 11 serving as the aseptic connection member, it is possible to prevent the connecting tube 12 and the thermoplastic tube 11 from folding or bending greatly during the steam sterilization and from causing the pure water H to leak out. In addition, since the expansion member 14 of the hollow fiber membrane module 10 can be arranged so as to be oriented upward, a few air bubbles that are generated inside can be guided and collected into the expansion member 14.

Since the expansion member 14 that expands due to the increase of the internal pressure of the hollow fiber membrane module 10 during the steam sterilization is connected to one liquid port 21 of the hollow fiber membrane module 10, the increase of the internal pressure during the steam sterilization can be absorbed and the steam sterilization can be performed appropriately.

Figure 5:
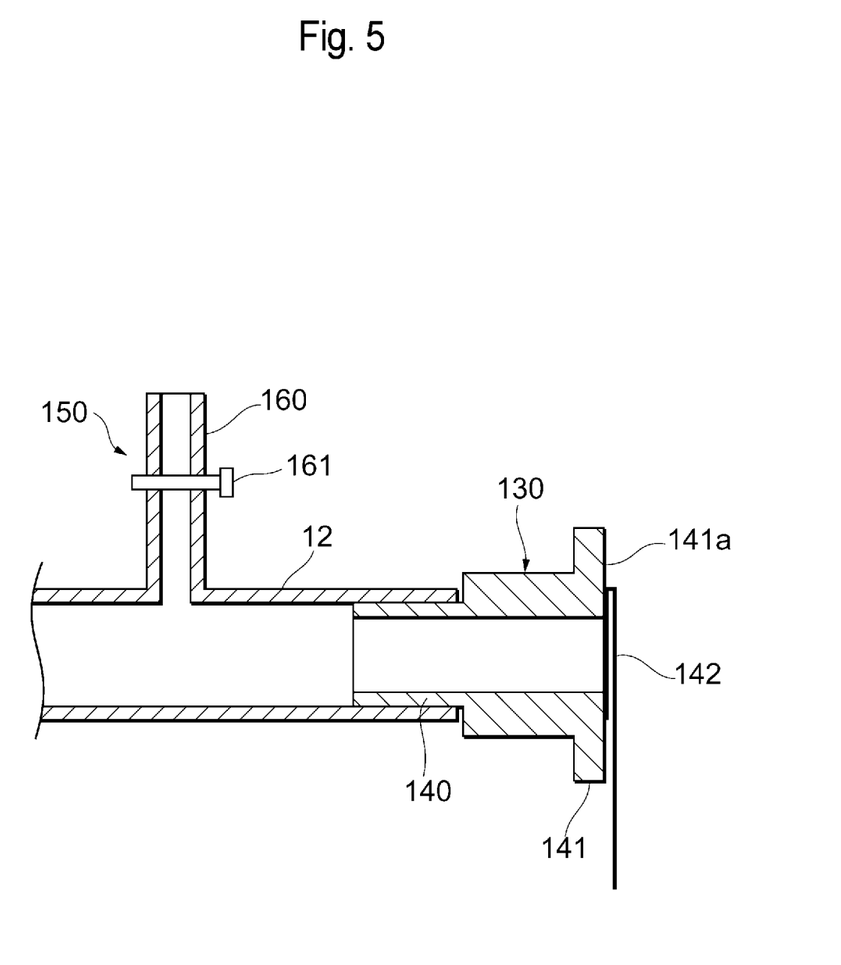
FIG. 5 is an illustration showing a configuration of an aseptic connection connector.
Figure 6:
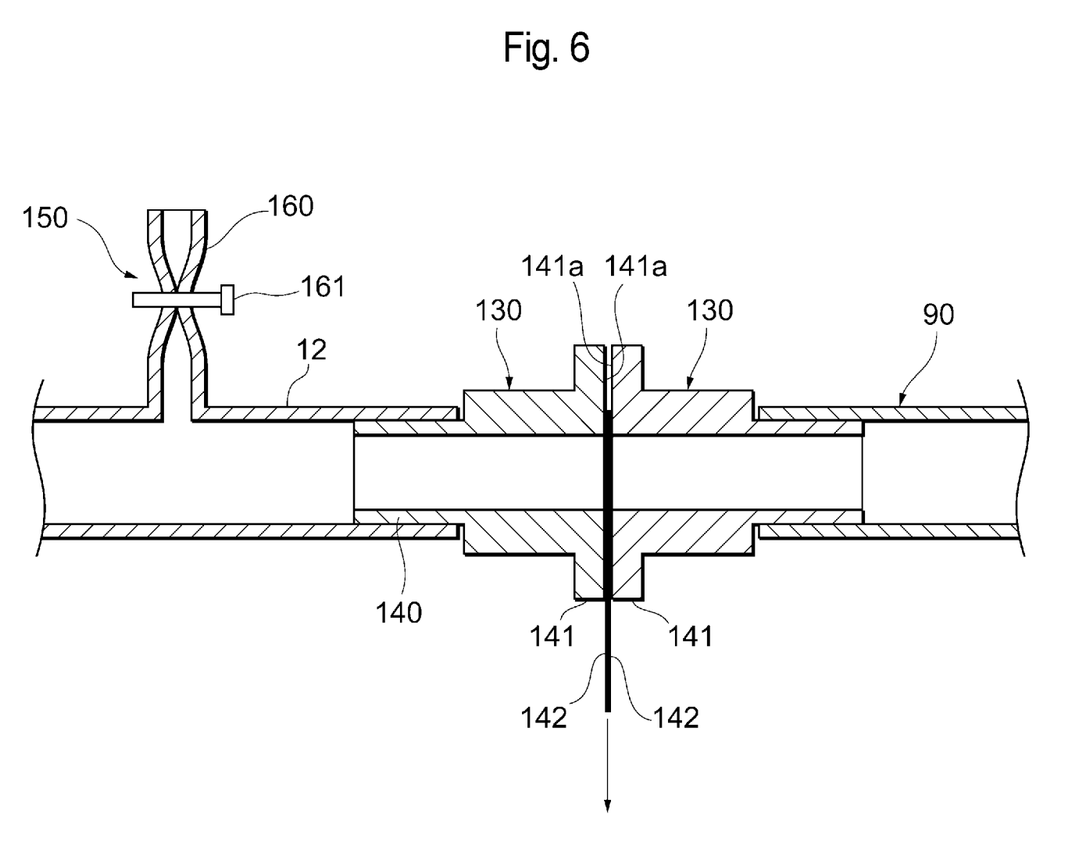
FIG. 6 is an illustration explaining the aseptic connection of the aseptic connection connector.

Although the aseptic connection member is a thermoplastic tube for allowing aseptic connection by means of thermal welding in the above embodiment, the aseptic connection member is not limited thereto and may be an aseptic connection connector that allows aseptic connection by removing a membrane interposed between connecting surfaces. In such case, an aseptic connection connector 130 is attached to, for example, the extremity of the connecting tube 12 as shown in FIG. 5. The aseptic connection connector 130 may include, for example, a tubular insertion part 140 to be inserted into the connecting tube 12, a flange-shaped connecting part 141 that forms a connecting surface 141a, and a sealing tape 142 to be provided on the connecting surface 141a for sealing a duct. Examples of the aseptic connection connector 130 may include a type having a male die and a female die and a type having a pair of dies having the same shape which can be used in combination. For example, a connecting surface 141a of one aseptic connection connector 130 and a connecting surface 141a of the other aseptic connection connector 130 (the aseptic connection connector of the tube on the liquid treatment circuit 90 side) are fitted with and fixed to each other as shown in FIG. 6, a tape 142 interposed between these connecting surfaces 141a is pulled out, and the tubes can be connected while the aseptic state is maintained. Aseptic connectors such as Ready Mate DAC manufactured by GE Healthcare, Kleenpak HT manufactured by PALL, and OPTA SET (Sterile Fluid Transfer) manufactured by Sartorius Stedim Biotech may be used as the aseptic connection connector 130.

In such case, the connecting tube 12 may be provided with an opening/closing part 150 capable of opening and closing the connecting tube 12 with respect to the atmosphere. The opening/closing part 150 may include, for example, a branched tube 160 which is branched from the connecting tube 12 with the other end being opened and a closure member 161 capable of closing the branched tube 160.

During the steam sterilization, the closure member 13 is attached at a position, located on the hollow fiber membrane module 10 side with respect to the branched tube 160, in the connecting tube 12 in order to close the connecting tube 12. In addition, the connecting tube 12 is fixed onto the fixing plate 80 by a fixture 81. The connecting tube 12 is opened to the atmosphere by the opening/closing part 150 and subjected to the steam sterilization in that state. At the end of the steam sterilization, the opening/closing part 150 is closed in order to hermetically seal the connecting tube 12.

In this example, it is also possible to prevent the pure water H in the hollow fiber membrane module 10 from coming into contact with the aseptic connection connector 130 serving as the aseptic connection member. With such configuration, since the tape 142 does not get wet, it is possible to appropriately perform the aseptic connection using the aseptic connection connector 130. In addition, the opening/closing part 150 can allow the inside of the connecting tube 12 to be exposed to the sterilization steam during a sterilization treatment and thus allow the inside of the connecting tube 12 to be sterilized appropriately. In this example, the opening/closing part 150 may not be provided. In that case, the aseptic connection connector 130 may be detached so as to open the connecting tube 12 within a sterilized bag during the steam sterilization and the aseptic connection connector 130 may be attached to the connecting tube 12 within the sterilized bag after the steam sterilization is completed.

Figure 7:
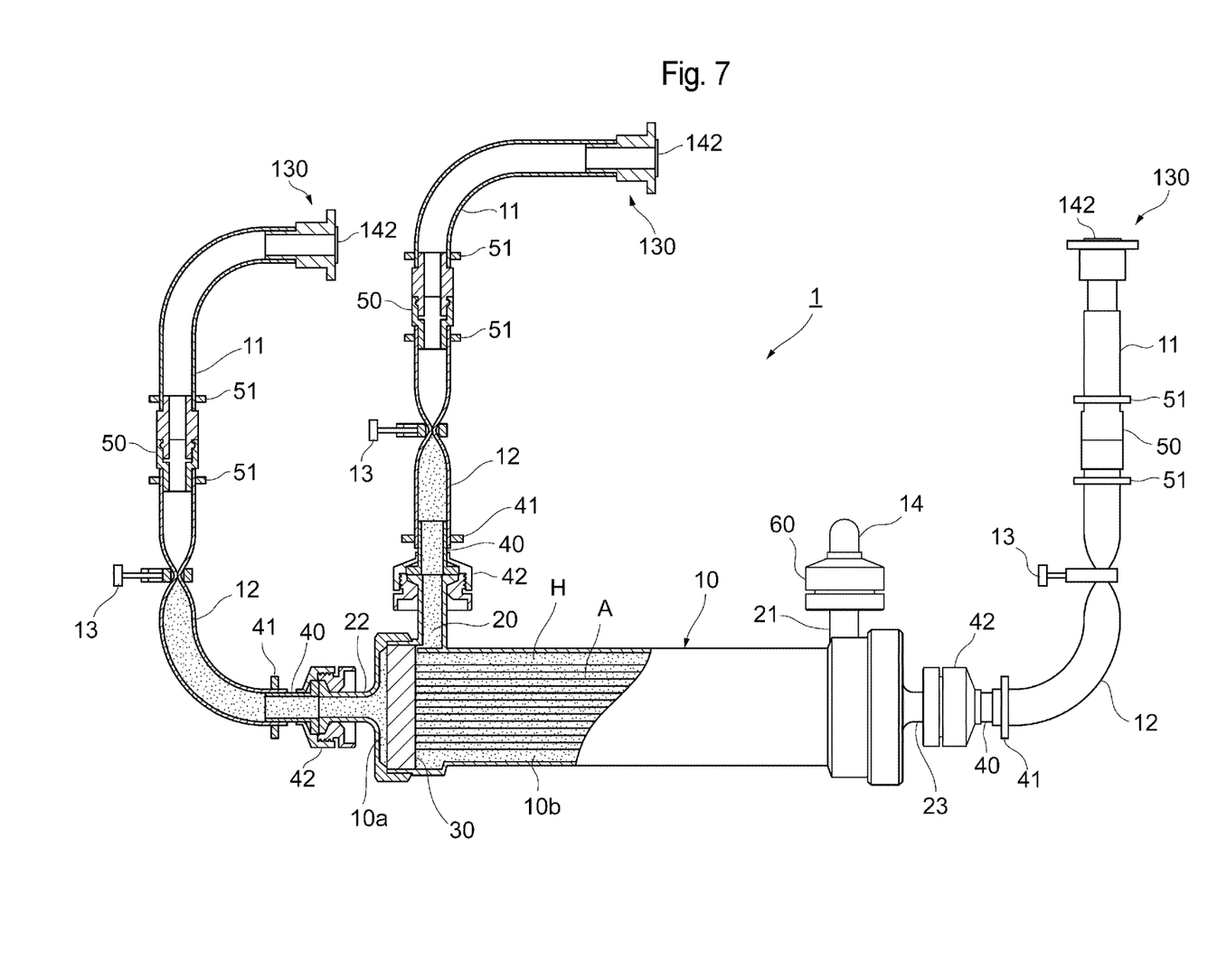
FIG. 7 is an illustration showing another configuration of a membrane module apparatus.

In the above embodiment shown in FIG. 1, the connector 50 for connecting the heat-resistant connecting tube 12 and the thermoplastic tube 11 may be replaced with a half-splittable connector 50, as shown in FIG. 7. In the same way as in the above embodiment, in the state where the connecting tubes 12 are connected respectively to the liquid ports 20, 22 and 23 of the hollow fiber membrane module 10 of the membrane module apparatus 1 and the connecting tubes 12 are closed by the closure members 13, the membrane module apparatus 1 may be placed in a sterilized bag and hermetically packaged, then subjected to sterilization with the connecting tubes 12 and thermoplastic tubes 11 being separated from each other, and the connecting tubes 12 and thermoplastic tubes 11 may be connected within the sterilized bag after the sterilization. The half-splittable connector may preferably be a connector having resistance to the steam sterilization and capable of allowing an easy connecting operation. For example, MPX-series connectors manufactured by Colder Products Company may be used. In the embodiments shown in FIG. 1 and FIG. 7, the opening/closing cap 52 may be replaced with the aseptic connection connector 130 shown in FIG. 5.

Although preferred embodiments of the present invention have been described above with reference to the attached drawings, the present invention is not limited to those embodiments. It is obvious that a person skilled in the art could conceive of various changes and modifications within the scope of ideas indicated in the scope of the claims and it should be understood that such changes and modifications belong to the technical scope of the invention as a matter of course.

For example, although the aseptic connection member is the thermoplastic tube 11 or the aseptic connection connector 130 in the above embodiments, the aseptic connection member is not limited thereto and the present invention may be applicable to other members capable of providing aseptic connection. Although the connecting tubes 12 are connected respectively to the three liquid ports 20, 22 and 23 of the hollow fiber membrane module 10, the number and position of the connecting tubes 12 are not limited thereto as long as there is one or more connecting tube. The configuration of the hollow fiber membrane module 10 is not limited to those employed in the above embodiments and the number, position and shape of the liquid ports are not limited to those employed in the above embodiments. In addition, connection means and connection methods for connecting the liquid ports of the hollow fiber membrane module 10, the connecting tube 12 and the aseptic connection member to one another are not limited to those employed in the above embodiments. The order of connection may also be changed as appropriate. The configurations of the fixing apparatus 70, closure member 13 and expansion member 14 are not limited to those employed in the above embodiments. Although the screw-type metallic pinch cock of the closure member 13 is particularly suitable for steam sterilization in which the internal pressure becomes high, the closure member 13 is not limited thereto and a non-screw type or non-metallic closure member may also be employed in the present invention.

In the embodiments set forth above, although the expansion member 1.3 is directly connected to the liquid port 21, it may be connected indirectly. For example, a tube may be connected to a liquid port of the hollow fiber membrane module 10 and the expansion member 14 may be attached to the extremity of such tube, or a tube with bifurcated extremities may be connected to the liquid port with one extremity thereof being connected to the expansion member 14 and the other extremity thereof being connected to the aseptic connection member.

The configurations of the liquid treatment system 100 and the liquid treatment circuit 90 are not limited to those employed in the above embodiments and they may have other configurations. The present invention is also applicable to membrane module apparatuses and liquid treatment systems for performing other liquid treatments such as a virus removing treatment.

INDUSTRIAL APPLICABILITY

The present invention is useful in providing a membrane module apparatus that allows an aseptic connection member to be applicable to a hollow fiber membrane module and avoids the need for a user to perform a sterilization treatment, a liquid treatment system having such membrane module apparatus, and a steam sterilization method of a hollow fiber membrane module.

REFERENCE SIGNS LIST

1: membrane module apparatus, 10: hollow fiber membrane module, 11: thermoplastic tube, 12: connecting tube, 13: closure member, 14: expansion member, 20-23 liquid port, 70: fixing apparatus, 90: liquid treatment circuit, 100: liquid treatment system, 130: aseptic connection connector, A: hollow fiber membrane

What is claimed is:

1. A membrane module apparatus to be subjected to steam sterilization, comprising:
    a hollow fiber membrane module filled with a liquid;
    an aseptic connection member configured to aseptically connect the membrane module apparatus to a duct, the aseptic connection member comprising a first aseptic connector having a first connecting surface and a second aseptic connector having a second connecting surface, the first aseptic connector and the second aseptic connector being fixed to each other;
    a sealing tape interposed between the first connecting surface and the second connecting surface, wherein the sealing tape is configured to be pulled out while maintaining the aseptic state;
    a connecting tube for connecting a liquid port of the hollow fiber membrane module and the aseptic connection member to each other; and
    a closure member capable of pinching and closing the connecting tube,
    wherein the connecting tube has heat resistance to the steam sterilization.

2. The membrane module apparatus according to claim 1, wherein the closure member is configured to apply pressure to the connecting tube via a screw mechanism to close the connecting tube.

3. The membrane module apparatus according to claim 1, further comprising an opening/closing part that opens and closes an internal space, the internal space being located on the aseptic connection member side with respect to the closure member, in the connecting tube relative to an atmosphere.

4. The membrane module apparatus according to claim 1, further comprising a fixing apparatus for fixing at least one of the connecting tube and the aseptic connection member.

5. The membrane module apparatus according to claim 4, wherein the fixing apparatus includes a fixing plate and a fixture for fixing at least one of the connecting tube and the aseptic connection member onto the fixing plate.

6. The membrane module apparatus according to claim 1, wherein the connecting tube is made of a silicon resin or a fluorine resin.

7. The membrane module apparatus according to claim 1, wherein the hollow fiber membrane module has a plurality of liquid ports, and at least one of the liquid ports is connected to an expansion member that expands due to an increase in an internal pressure of the hollow fiber membrane module during the steam sterilization.

8. The membrane module apparatus according to claim 7, wherein:
    the hollow fiber membrane module has two liquid ports communicating with an inside of a hollow fiber membrane and two liquid ports communicating with an outside of the hollow fiber membrane; and one of the liquid ports communicating with the outside of the hollow fiber membrane is connected to the expansion member and the other three liquid ports are connected to the connecting tube.

9. The membrane module apparatus according to claim 1, wherein the aseptic connection member is a thermoplastic tube configured to be thermally welded.

10. A packaging body containing a membrane module apparatus, the packaging body hermetically packaging the membrane module apparatus according to any one of claims 1-9.

11. The packaging body containing a membrane module apparatus according to claim 10, wherein the packaging body provides packaging with an air permeable member.

12. A liquid treatment system including the duct and the membrane module apparatus according to any one of claims 1-9, wherein the aseptic connection member of the membrane module apparatus is aseptically connected to the duct.

* * * * *